United States Patent
Brunner et al.

(10) Patent No.: US 10,113,395 B2
(45) Date of Patent: Oct. 30, 2018

(54) ORGANOPHILIC NANOPARTICLES IN DIRECT EMULSION SYSTEMS AND METHODS FOR THEIR USE AS WELLBORE DRILLING FLUIDS

(71) Applicant: M-I LLC, Houston, TX (US)

(72) Inventors: Sara Brunner, Houston, TX (US); Natalia Collins, The Woodlands, TX (US)

(73) Assignee: M-I L.L.C., Houston, TX (US)

( * ) Notice: Subject to any disclaimer, the term of this patent is extended or adjusted under 35 U.S.C. 154(b) by 455 days.

(21) Appl. No.: 14/815,453

(22) Filed: Jul. 31, 2015

(65) Prior Publication Data

US 2017/0029687 A1 Feb. 2, 2017

Related U.S. Application Data

(60) Provisional application No. 62/031,571, filed on Jul. 31, 2014.

(51) Int. Cl.
| | |
|---|---|
| *E21B 37/06* | (2006.01) |
| *C09K 8/52* | (2006.01) |
| *C09K 8/26* | (2006.01) |
| *C09K 8/536* | (2006.01) |
| *E21B 37/00* | (2006.01) |
| *C09K 8/60* | (2006.01) |
| *C09K 8/86* | (2006.01) |

(52) U.S. Cl.
CPC ............. *E21B 37/00* (2013.01); *C09K 8/602* (2013.01); *C09K 8/86* (2013.01)

(58) Field of Classification Search
CPC ........... E21B 37/06; E21B 37/00; C09K 8/52; C09K 8/26; C09K 8/536
See application file for complete search history.

(56) References Cited

U.S. PATENT DOCUMENTS

| | | | | |
|---|---|---|---|---|
| 7,134,496 | B2 * | 11/2006 | Jones | C09K 8/36 166/278 |
| 7,855,168 | B2 * | 12/2010 | Fuller | C09K 8/508 166/276 |
| 2014/0110119 | A1 * | 4/2014 | Luyster | C09K 8/502 166/305.1 |

* cited by examiner

*Primary Examiner* — Catherine Loikith
(74) *Attorney, Agent, or Firm* — David J. Smith

(57) ABSTRACT

A direct emulsion fluid includes an aqueous continuous phase, an oleaginous discontinuous phase, calcium carbonate comprising an organophillic coating, and a surfactant. A method may include emplacing into a formation a direct emulsion fluid and pumping a breaker fluid, wherein the breaker fluid degrades a filtercake formed by the direct emulsion fluid. The direct emulsion fluid may include an aqueous continuous phase; an oleaginous discontinuous phase; calcium carbonate comprising an organophillic coating; and a first surfactant.

17 Claims, No Drawings

ORGANOPHILIC NANOPARTICLES IN DIRECT EMULSION SYSTEMS AND METHODS FOR THEIR USE AS WELLBORE DRILLING FLUIDS

This application claims the benefit of U.S. Provisional Application No. 62/031,571 filed on Jul. 31, 2014, incorporated by reference herein in its entirety.

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

In most rotary drilling procedures the drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either a water-based or an oil-based mud.

As an example of a completion fluid, a reservoir drill-in fluid (RDF) is utilized for drilling through a reservoir section of a wellbore. RDF's are typically used for successful reservoir zone drilling, minimizing damage to and maximizing production of exposed zones, and facilitation of the well completion clean-up process.

In particular, direct emulsion systems may not have been used extensively in oil field drilling fluids, such as completion fluids and/or RDF's, due to their relative emulsion instability, sensitivity to common contaminants, and/or susceptibility to undesired reversibility.

Thus, there exists a continuing need for improvements in the completion fluids and/or reservoir drill-in fluids utilizing thermodynamically stable direct emulsion systems.

DETAILED DESCRIPTION

In one aspect, embodiments disclosed herein relate to the use of low density direct emulsion wellbore fluids, such as reservoir drill-in fluids (RDF's) for example, to control fluid loss in a formation.

As referred to herein, a direct emulsion is an oil in water emulsion, where an non-oleaginous fluid (e.g., aqueous fluid) serves as a continuous phase and an oleaginous fluid serves as a discontinuous or internal phase, the non-oleaginous fluid being stabilized or emulsed in the oleaginous fluid by an emulsifying agent. Thus, a direct emulsion may be described as a blend of two immiscible solutions to provide functions of a reservoir drilling fluid (RDF) such as efficient cuttings suspension, fluid loss control, and friction coefficient.

HIPR Direct Emulsion Fluids

As discussed above, the methods of the present disclosure use direct emulsion fluids having an oil/water ratio of less than 50/50, which may also be referred to as high internal phase ratio (HIPR) direct emulsions. The oil/water ratio in direct emulsion fluids conventionally used in the field is in the range of 65/45 to 85/15. In one aspect, the present disclosure provides an 8.1 ppg direct emulsion fluid developed with an oil/water ratio of 42.5/57.5 Such fluids may exhibit relative stability at 180° F. for a period of 5 days and a fluid loss of 15-16 mL in approximately 16 hrs. Several factors have conventionally dictated such ranges, including: the concentration of solids in the mud to provide the desired mud weight (solids laden muds must have a high O/W ratio to keep the solids oil wet and dispersed) and the high viscosities often experienced upon increase of the internal aqueous phase (due to the greater concentration of the dispersed internal phase).

The instability of the emulsions may be explained by examining the principles of colloid chemistry. The stability of a colloidal dispersion (emulsion for a liquid-liquid dispersion) is determined by the behavior of the surface of the particle via its surface charge and short-range attractive van der Waals forces. Electrostatic repulsion prevents dispersed particles from combining into their most thermodynamically stable state of aggregation into the macroscopic form, thus rendering the dispersions metastable. Emulsions are metastable systems for which phase separation of the oil and water phases represents to the most stable thermodynamic state due to the addition of a surfactant to lower the surface tension and/or interfacial tension between oil and water.

Thus, embodiments of the present disclosure relate to direct emulsion fluids having a high internal phase concentration (<50/50 O/W), which are stabilized by an emulsifying agent without significant increases in viscosity. Additionally, by virtue of the greater internal phase concentration, weight may be provided to the fluid partly through the inherent weight of the aqueous or other internal phase, thus minimizing the total solids content.

As the internal aqueous phase of a given fluid system increases, the viscosity and rheological profile of the fluid may also increase due to the greater concentration of the dispersed internal phase. However, the direct emulsion fluids of the present disclosure may possess rheological profiles more similar to fluids having a lower internal phase concentration, i.e., >50/50 O/W. In particular, in accordance with embodiments of the present disclosure, the fluids may possess a high shear viscosity of less than 200 at 600 rpm, and a low shear viscosity of less than 40 at 6 and 3 rpm, and less than 20 at 6 and 3 rpm in particular embodiments (all of which are measured using a Fann 35 Viscometer from Fann Instrument Company (Houston, Tex.) at 120° F.).

Direct emulsions of the present disclosure, described as a blend of two immiscible solutions, may be mini- or Nano-emulsions with emulsion droplet sizes of 0.1-1 micron. Organophilic nanoparticles have been dispersed in oil phase to enhance the emulsion stability by reducing the energies of interaction between the surfactant molecule adsorbed at the interface between oil and water. As a result, direct emulsions herein may be thermodynamically stable, with enhanced fluid loss control and reduced polymer load due to enhanced viscosity provided by the presence of the emulsion droplets.

Bridging Materials

Effective bridging materials used in low density direct emulsion systems may comprise a blend of sized calcium carbonate particles with organophilic nanoparticles. Organophilic nanoparticles, such as those utilized as a coating material on sized calcium carbonate, may be dispersed in an oil phase, interacting with oil emulsion droplets to enhance the emulsion stability of the direct emulsion system while improving low end rheology and providing superior fluid loss control. The addition of nanoparticles may reduce the energies of interaction between a surfactant molecule adsorbed at the interface of the oil and water phases. As a result, the direct emulsion system may exhibit enhanced thermodynamic stability and reduced polymer load due to enhanced viscosity provided by the presence of emulsion droplets. Direct emulsion systems described herein with added nanoparticles may sustain varied drilling conditions such as simulated stress drilling conditions, contamination with low gravity solids (LGS), high shear mixing, heat aging, and contamination with cement. Although the emulsion systems exhibited some sensitivity to cement contamination, the direct emulsion systems utilizing ethoxylated alcohol surfactant was able to regain an original shear thinning viscosity after treatment with 3 mL of citric acid. Further, such systems may provide fluid loss control and exhibit improved low end rheology.

The present disclosure also relates to fluids having a HIPR wherein the emulsion droplet size is smaller as compared to conventional emulsion droplets. For example, the non-oleaginous phase distributed in the oleaginous phase may have an average diameter in the range of 0.5 to 5 microns in one embodiment, and in the range of 1 to 3 microns in a more particular embodiment. The droplet size distribution may generally be such that at least 90% of the diameters are within 20% or especially 10% of the average diameter. In other embodiments, there may be a multimodal distribution. Such droplet size may be approximately one-third to one-fourth the size of emulsion droplets formed using conventional emulsifiers. In a particular embodiment, the emulsion droplets may be smaller than the solid weighting agents used in the fluids.

Oleaginous and Non-Oleaginous Phases

The oleaginous fluid may be a liquid, such as a natural or synthetic oil, selected from the group including diesel oil, mineral oil, a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art. In a particular embodiment, the fluids may be formulated using diesel oil or a synthetic oil as the external phase. The concentration of the oleaginous fluid should be sufficient so that a direct emulsion forms and may be less than about 50% by volume of the direct emulsion. In one embodiment, the amount of oleaginous fluid is from about 50% to about 20% by volume and more preferably about 40% to about 20% by volume of the direct emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the direct emulsion fluid disclosed herein is a liquid and preferably is an aqueous liquid. The non-oleaginous liquid may be selected from the group including fresh water, sea water, a brine containing organic and/or inorganic dissolved salts, liquids containing water-miscible organic compounds, and combinations thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The amount of the non-oleaginous fluid is typically less than the theoretical limit needed for forming a direct emulsion. Thus, in one embodiment, the amount of non-oleaginous fluid is more than about 50% by volume and preferably from about 50% to about 80% by volume. In another embodiment, the non-oleaginous fluid is preferably from about 60% to about 80% by volume of the direct emulsion fluid.

Conventional methods can be used to prepare the drilling fluids disclosed herein in a manner analogous to those normally used, to prepare conventional oil-based drilling fluids. In one embodiment, a desired quantity of oleaginous fluid such as a base oil and a suitable amount of a surfactant are mixed together and the remaining components are added sequentially with continuous mixing. A direct emulsion may also be formed by vigorously agitating, mixing or shearing the oleaginous fluid and the non-oleaginous fluid.

Emulsions

The term "HLB" (Hydrophilic Lipophilic Balance) may refer to the ratio of the hydrophilicity of the polar groups of the surface-active molecules to the hydrophobicity of the lipophilic part of the same molecules. One skilled in the art would appreciate that an HLB value may be calculated by considering the molecular weight contributions of the respective hydrophilic and lipophilic portions and taking the ratio thereof (divided by 5). Generally, the Bancroft rule applies to the behavior of emulsions: emulsifiers and emulsifying particles tend to promote dispersion of the phase in which they do not dissolve very well; for example, a compound that dissolves better in water than in oil tends to form oil-in-water emulsions (that is they promote the dispersion of oil droplets throughout a continuous phase of water). Emulsifiers are typically amphiphilic. That is, they possess both a hydrophilic portion and a hydrophobic portion. The chemistry and strength of the hydrophilic polar group compared with those of the lipophilic nonpolar group determine whether the emulsion forms as an oil-in-water or water-in-oil emulsion. In particular, emulsifiers may be evaluated based on their HLB value. Generally, to form a water-in-oil emulsion, an emulsifier (or a mixture of emulsifiers) having a low HLB, such as between 3 and 8, may be desirable. In a particular embodiment, the HLB value of the emulsifier may range from 4 to 6.

Surfactants

Other additives that may be included in the wellbore fluids disclosed herein include for example, wetting agents, organophilic clays, viscosifiers, surfactants, dispersants, interfacial tension reducers, pH buffers, mutual solvents, thinners, thinning agents and cleaning agents. The addition of such agents should be well known to one of ordinary skill in the art of formulating drilling fluids and muds.

Surfactants may generally be classified as emulsifying agents, penetrants, wetting agents, dispersing agents, protective colloids, or the like. Chemically, surfactants may be categorized as anionic, nonionic, cationic, amphoteric, oil-soluble, or the like. An anionic surfactant will ionize in solution to yield a large negatively charged ion (anion) and a relatively small positively charged ion, example of which include, but are not limited to, sulfates, alkyl sulfonic acids and their salts, and carboxylic acids and their salts.

In contrast, a nonionic surfactant will not ionize in solution and may be classified as having alkoxy ether, alkoxy ester, or amide linkages to the solubilizing groups. In some embodiments, a direct emulsion may comprise a nonionic surfactant comprising a phosphate blend and/or phospholipid surfactant. In one embodiment, a phosphate blend surfactant/emulsifier added to the direct emulsion may be sold as SAFE-LUBE (provided by M-I L.L.C., Houston, Tex.). In other aspects, the phosphate blend emulsifier was added in an amount ranging from about 2 ppb to 8 ppb.

A direct emulsion fluid may be pumped into a formation, resulting in a deposition of a filtercake following the passage of the fluid into the formation. To degrade the filtercake, a breaker fluid may further be pumped into the formation. In some embodiments, the breaker fluids herein may comprise a solvent/surfactant, chelant, and/or a breaker to achieve successful cleanup of a filtercake, such as within approximately 5 days. Further, such direct emulsions may have a coefficient of friction of approximately 0.14, as compared to the range of 0.0 to 0.3 of typical water-based muds.

Breaker Fluids

The fluids disclosed herein may be useful in the drilling, completion and working over of subterranean oil and gas wells. In particular the fluids disclosed herein may find use in formulating drilling muds and completion fluids that allow for the easy and quick removal of the filter cake. Such muds and fluids are especially useful in the drilling of horizontal wells into hydrocarbon bearing formations.

In various embodiments, methods of drilling a subterranean hole with a direct emulsion drilling fluid may comprise mixing an oleaginous fluid, a non-oleaginous fluid, an emulsifier, such as those described above, and in the ratios described above, to form a direct emulsion; and drilling the subterranean hole using this direct emulsion as the drilling fluid. The fluid may be pumped down to the bottom of the well through a drill pipe, where the fluid emerges through ports in the drilling bit, for example. In one embodiment, the fluid may be used in conjunction with any drilling operation, which may include, for example, vertical drilling, extended reach drilling, and directional drilling. One skilled in the art would recognize that oil-based drilling muds may be prepared with a large variety of formulations. Specific formulations may depend on the state of drilling a well at a particular time, for example, depending on the depth and/or the composition of the formation.

EXPERIMENTAL PROCEDURE

Cores of residual fluids/salts were extracted by mild miscible flow through solvent extraction. Routine gas properties of permeability and porosity were measured. Samples were saturated with formation water/simulated formation water (or 10% NaCl) and centrifuged. The cores were mounted vertically in a confining cell (e.g., hassle, hydrostatic) with the wellbore side facing upward, thus the production flow is from the bottom to the top, forming the filter cake on the top surface with an 8 mm mud spacer ring in place. Properties, such as net confining stress, system pressure (pore pressure) and temperature, were raised to desired levels. The initial permeability to lab oil (LVT-200) at increasing flow rates (e.g., 2, 4, 6 ml/min) were measured until stable permeability was achieved. Delta pressure was monitored. The cores were exposed to drilling fluid at 500 psi of overbalance pressure the rate of filtration into core was recorded at 4 hours dynamic monitor filtration over time. The return permeability was measured similarly to the initial permeability measurement, as pertaining to flow rates. The flow initiation pressures and temperatures were noted prior to removing and photographing the cores.

Examples

Permeability tests were conducted to evaluate the effects of a low density direct emulsion fluid on a medium permeability (~300 mD air permeability) Berea sandstone core. The test fluid contained SafeCarb* (material provided by M-I L.LC.) bridging material. The tests were conducted at approximately 166° F./74.4° C., 500 psi pore pressure and net confining stress with an overbalance of 500 psi over a period of 4 hours.

TABLE 1

Summary of permeability test results

| Test #/ Core Sample | Initial Perm, mD | Volume of Filtration, ml | % Pore Volume Filtration | Return Perm, mD/ % Return | Flow Initiation Pressure, psi |
|---|---|---|---|---|---|
| T#1/Berea | 151.1 mD | 6.01 ml | 48% | 96.9 mD/ 64.2% | 21.9 psi |

The low density direct emulsion fluids moderately controlled fluid loss. The results were 48% pore volume filtration (T#1) and 54.2% filtration (T#2) over a 240 minute period of dynamic mud exposure at 500 psi overbalance. Flow initiation pressures are acceptable with test 2 showing a lower value by 8.6 psi.

For Test #1, the return permeability phase of the test showed a steady increase in permeability over time and at increased flow rates. The return permeability measurement was for 377 minutes and achieved a fair result of 64.2% return.

The result of Test #2 was the return permeability phase stabilized at 190 minutes. The reason for the early stabilization as compared to the first test may be due to the bridging.

Low density direct emulsion systems herein have been formulated to provide various functions of reservoir drilling fluids (RDF's) in terms of efficient cuttings suspension, caring characteristics, fluid loss control, and friction coefficient.

| 8.4 ppg Direct Emulsion System Formulation | | |
|---|---|---|
| Product | Units | Phosphate Blend/ Phospholipid Surfactant |
| Fresh water | lb/bbl | 253.15 |
| Viscosifier | lb/bbl | 0.7 |
| Fluid loss control agent (starch) | lb/bbl | 4.0 |
| pH Buffer | lb/bbl | 0.2 |
| Organophillic bridging component | lb/bbl | 5.4 |
| Sized Calcium | lb/bbl | 10.0 |

-continued

| 8.4 ppg Direct Emulsion System Formulation | | |
|---|---|---|
| Carbonate, 2 | | |
| Sized Calcium | lb/bbl | 5.6 |
| Carbonate, 10 | | |
| Oil | lb/bbl | 67.6 |
| Phosphate Blend/ | Bbl | 2.0 |
| Phospholipid Surfactant | | |

| | | Oil-Water Ratio | | |
|---|---|---|---|---|
| | | 20/80 | | 20/80 |
| Readings @ 120° F. Fann 35 | | Initial | AHR@ 150 F. | Initial | AHR@ 150 F. |
| 600 | | 40 | 38 | 39 | 37 |
| 300 | | 30 | 31 | 29 | 27 |
| 200 | | 27 | 27 | 26 | 25 |
| 100 | | 22 | 19 | 20 | 18 |
| 6 | | 10 | 8 | 9 | 7 |
| 3 | | 8 | 7 | 8 | 6 |
| PV | cP | 10 | 7 | 10 | 10 |
| YP | lbs/100 ft² | 20 | 24 | 19 | 17 |
| 10 min gel | lbs/100 ft² | 9 | 7 | 8 | 7 |
| 10 sec gel | lbs/100 ft² | 10 | 8 | 9 | 8 |
| pH | | 9.21 | 9.0 | 9.18 | 9.0 |
| HTHP spurt 16 hr @ 122° F. on 5 micron disk | ml | | | | |

The direct emulsion fluids were mixed using the order of addition as listed in Table 2. The order of addition of each component into the mixture may be significant for wettability management and polymer hydration. The bridging material package may include sized calcium carbonate with organophillic calcium carbonate blend. The presence of organophillic materials may enhance the system's sustainability to undesired wettability change.

Direct emulsion properties were evaluated initially after mixing the components and after about 16 hours of dynamically heat aging at BHT of 150° F. The direct emulsion products exhibited relatively stable emulsions and acceptable rheological and fluid loss properties. Thus, rheological properties have been shown to not be substantially affected by heat aging. No foaming tendencies were observed after shearing. Minor differences at low end rheology readings between the fluid products may be explained by the presence of alcohol in the ethoxylated alcool surfactant, which acts as a co-surfactant. The presence of alcohol may change the interaction balance of the surfactant and its physicochemical environment behavior of the system and size of emulsion droplets.

The direct emulsions were continuous checked for rheological properties as well as the maintenance of water as the continuous phase. Phase reversibility is also continuously measured since the direct emulsion system is being deposited continually on the filtercake during the drilling process.

TABLE 3

Friction Reduction Test on DE and Polymer RDF System and EP Digital

| Step | EP Coefficient |
|---|---|
| Base Polymer RDF | 0.26 |
| Direct Emulsion with Phosphate Blend/ Phospholipid Surfactant | 0.21 |

The data in Table 3, measured by a lubricity meter after the second stage of shearing, supports the aforementioned.

TABLE 4

Stress Contamination Tests Rheological Data

| | DE# 2 | DE# 2 | DE# 2 | DE# 2 |
|---|---|---|---|---|
| Readings @ 120° F. Fann 35 | With 7 ppg Rev Dust | After high shear | With 3.5 ppg CaCl₂ | With 3.5 ppg cement |
| 600 | 47 | 51 | 60 | 66 |
| 300 | 39 | 42 | 46 | 46 |
| 200 | 34 | 36 | 40 | 41 |
| 100 | 27 | 27 | 29 | 32 |
| 6 | 11 | 11 | 11 | 11 |
| 3 | 9 | 8 | 9 | 10 |
| PV, cP | 8 | 9 | 14 | 20 |
| YP, lbs/100 ft² | 31 | 33 | 32 | 26 |
| 10 min gel, lbs/100 ft² | 10 | 9 | 9 | 12 |
| 10 sec gel, lbs/100 ft² | 11 | 10 | 10 | 14 |
| pH | 9.18 | Some foaming | 9.11 | 12.0 |

The direct emulsion system herein was shown to be suitable for field application. The direct emulsion system DE #2 was shown to reverse the continuous phase from water to oil at high pH environments.

As another example, a direct emulsion was produced with an oil water ratio of 42.5/57.5 by adding 8 ppb Flo-Trol and 9 ppb SAFE-LUBE after establishment of the emulsion. Table 5 indicates the resulting positive rheological and fluid loss properties. Also, the direct emulsion herein demonstrated little to no phase separation following status aging for approximately 5 days at 180° F. Furthermore, lubricity test of the direct emulsion fluid indicated a relatively low coefficient of friction of 0.14.

TABLE 5

Fluid Loss and Rheological Data for Direct Emulsion Fluid

| | Input | |
|---|---|---|
| Salt Type | None | |
| Description | Direct Emulsion | |
| Mud Type | DE System | |
| Mud Weight (lb/gal) | 7.6 | |
| Mud Volume (bbl) | 1 | |
| Bridging Agent | SafeCarb | |
| Bridging Agent SG | 2.8 | |
| Oil/Brine Ratio (0-100) | 42.5/57.5 | |
| SG Oil | 0.8 | |

| Products | Output (concentration) | Fluid Loss (time & amount) | |
|---|---|---|---|
| Water | 175.31 lb/bbl | 1 min | 2.0 mL |
| Viscosifier | 0.30 lb/bbl | 4 min | 3.0 mL |
| pH Buffer | 0.20 lb/bbl | 9 min | 3.5 mL |
| Phoshate Blend/Phospholipid Surfactant | 9.00 lb/bbl | 16 min | 4.5 mL |
| Oil | 103.79 lb/bbl | 25 min | 5.0 mL |
| Fluid loss control agent (starch) | 8.00 | 30 min | 5.0 mL |
| Defoamer | — | 36 min | 5.5 mL |
| Organophillic bridging component | 5.4 | 49 min | 6.0 mL |
| Sized Calcium Carbonate, 2 | 15.0 | 1 hr | 6.0 mL |
| Sized Calcium Carbonate, 10 | 5.6 | 1.5 hrs | 7.0 mL |

TABLE 5-continued

Fluid Loss and Rheological Data for Direct Emulsion Fluid

| Sized Calcium Carbonate, 40 components | 5.0 | 2 hrs | 8.0 mL |
|---|---|---|---|
| | | 16 hrs | 16.0 |

| Rheology (at 120° F.) | Initial | After HR for 16 hrs at 150° F. | 5-day Static Aging (180° F.) | | |
|---|---|---|---|---|---|
| 600 | 65.0 | 120.0 | 112.0 | | |
| 300 | 42.0 | 81.0 | 79.0 | | |
| 200 | 33.0 | 62.0 | 64.0 | | |
| 100 | 23.0 | 42.0 | 44.0 | | |
| 6 | 6.0 | 11.0 | 9.0 | | |
| 3 | 3.0 | 6.0 | 5.0 | | |
| PV | 23.0 | 39.0 | 33.0 | | |
| YP | 19.0 | 42.0 | 46.0 | | |
| 10'/10" | 4/11 | 7/11 | 6/12 | | |
| pH | 10.01 | 10.0 | 8.3 | | |
| MW | | 8.1 | | | |
| Calculated Mud Weight (lb/gal) | 7.8 | Lubricity - 0.14 | Formulated Brine SG | 0.9 | |
| Formulated Brine Density | 7.51 | Water - 0.34 | Calculated Oil/Water Ratio | 42.5/57.5 | |

Breaker testing and high temperature high pressure (HTHP) analyses were carried out to determine which breaker(s) would be well suited to clean up filtercakes produced by direct emulsions taught herein. The breaker formulation included in Table 6 below incorporated a solvent/surfactant, chelant, and enzyme combination that worked efficiently to completely remove the filtercake in 5 days at 180° F.

TABLE 6

Breaker Test Results

| Product | mL | @5 psi | Initial Flowback Production | | Final Flowback Injection | | Flowback Production | | Flowback Injection | |
|---|---|---|---|---|---|---|---|---|---|---|
| | | | mL | sec | mL | sec | Initial mL/sec | Final mL/sec | Initial mL/sec | Final mL/sec |
| Breaker | 23 | | | | | | | | | |
| Chelant | 25 | 1 | 198 | 17 | 1 | 198 | 17 | 11.6 | 11.6 | 10.5 | 10.8 |
| Enzyme | 2 | 2 | 200 | 18 | 2 | 198 | 17 | % | 100 | % | 102 |
| Corrosion Inhibitor | 0.2 | 3 | 196 | 16 | 3 | 198 | 17 | | | | |
| Water | 49.8 | Average | 198 | 17 | Average | 198 | 17 | | | | |
| Total | 100 | @5 psi | | | | | | | | | |
| pH before/after | — | | | | | | | | | | |
| Event | | mL | | | | | | | | | |
| Spurt | 0 | | | | | | | | | | |
| Breakthrough @ 9 min 20 sec | 5.5 | 1 | 194 | 18 | 1 | 188 | 18 | | | | |
| | | 2 | 198 | 19 | 2 | 194 | 18 | | | | |
| | | 3 | 198 | 19 | 3 | 188 | 17 | | | | |
| | | Average | 197 | 19 | Average | 190 | 18 | | | | |

Low density direct emulsion fluids discussed herein exhibit relative static stability and little change in rheological properties at approximately 180° F. over a period of 5 days. Further, fluids herein exhibited relative stability at room temperature for time period of weeks. The fluids may also demonstrate low 16 hour fluid loss properties while resulting in filtercake dissolution when combined with commercially available breaker components. Performance evaluation tests performed on the direct emulsions herein indicate superior rheological behavior with high low shear readings and enhanced suspension characteristics as reduced polymer load plus improved fluid loss control as compared to traditional polymer systems. Such reduced polymer load may cause direct emulsion systems to be easily mixed, particularly at field conditions. Also, the relatively low friction reduction coefficients for the present direct emulsions are compatible with those of water-based polymer systems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A direct emulsion fluid comprising:
   an aqueous continuous phase;
   an oleaginous discontinuous phase;
   calcium carbonate with a coating of organophilic nanoparticles; and
   a surfactant.

2. The fluid of claim 1, wherein the surfactant comprises an anionic surfactant, a nonionic surfactant, or a combination thereof.

3. The fluid of claim 2, wherein the nonionic surfactant comprises a phosphate group, a phospholipid, or a combination thereof.

4. The fluid of claim 1 further comprising a pH buffer.

5. A method comprising:
   emplacing into a formation a direct emulsion fluid comprising:
   an aqueous continuous phase;
   an oleaginous discontinuous phase;
   calcium carbonate with a coating of organophilic nanoparticles; and
   a surfactant.

6. The method of claim 5, wherein the surfactant comprises an anionic surfactant, a nonionic surfactant, or a combination thereof.

7. The method of claim 6, wherein the nonionic surfactant comprises a phosphate group, a phospholipid, or a combination thereof.

8. The method of claim 5, wherein the fluid further comprises a pH buffer.

9. A method comprising:
emplacing into a formation a direct emulsion fluid comprising:
an aqueous continuous phase;
an oleaginous discontinuous phase;
calcium carbonate comprising an organophilic coating; and
a first surfactant; and
pumping a breaker fluid comprising:
a second surfactant;
a chelant; and
an enzyme;
wherein the breaker fluid degrades a filter cake formed by the direct emulsion fluid.

10. The method of claim 9, wherein the surfactant comprises an anionic surfactant, a nonionic surfactant, or a combination thereof.

11. The method of claim 10, wherein the nonionic surfactant comprises a phosphate group, a phospholipid, or a combination thereof.

12. The method of claim 9, wherein the fluid further comprises a pH buffer.

13. The method of claim 9, wherein the organophilic coating includes organophilic nanoparticles.

14. A direct emulsion fluid comprising:
an aqueous continuous phase;
an oleaginous discontinuous phase;
a phospholipid surfactant stabilizing the oleaginous discontinuous phase within the aqueous continuous phase; and
a viscosifier.

15. The direct emulsion of claim 14, further comprising a plurality of calcium carbonate particles.

16. The direct emulsion of claim 15, wherein at least a portion of the calcium carbonate particles have an organophilic coating thereon.

17. A method comprising:
emplacing into a formation a direct emulsion fluid comprising:
an aqueous continuous phase;
an oleaginous discontinuous phase;
a phospholipid surfactant stabilizing the oleaginous discontinuous phase within the aqueous continuous phase; and
a viscosifier.

* * * * *